No. 633,998. Patented Oct. 3, 1899.
T. HILL.
PUSH WAGON.
(Application filed Mar. 10, 1899.)
(No Model.) 2 Sheets—Sheet 1.
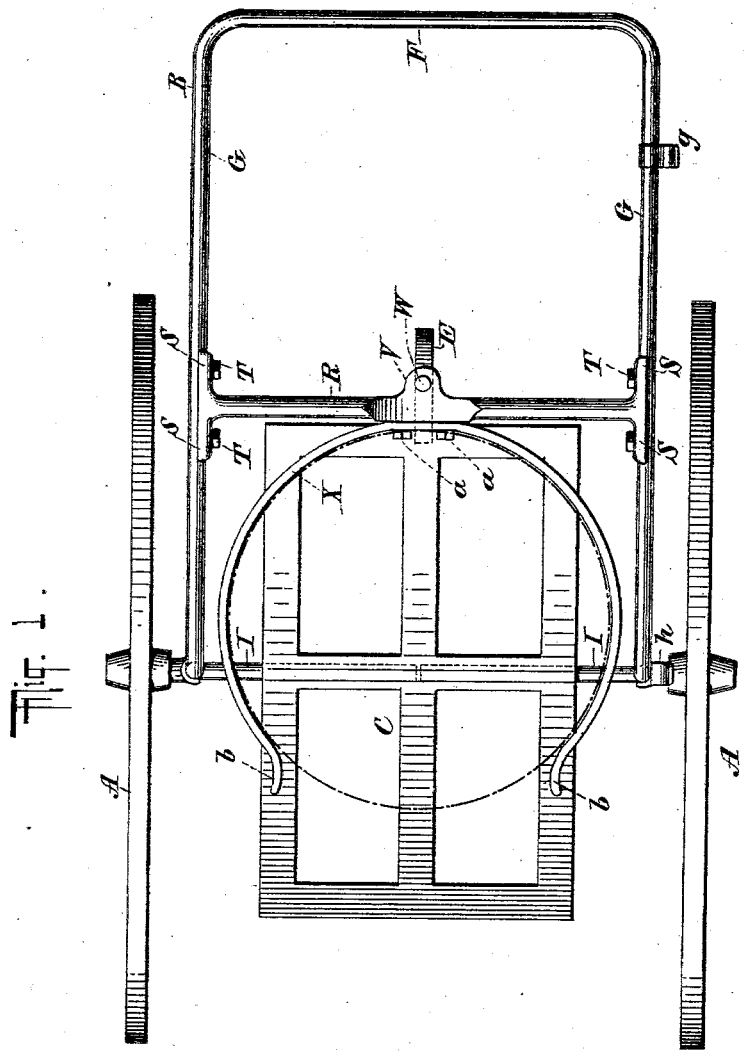
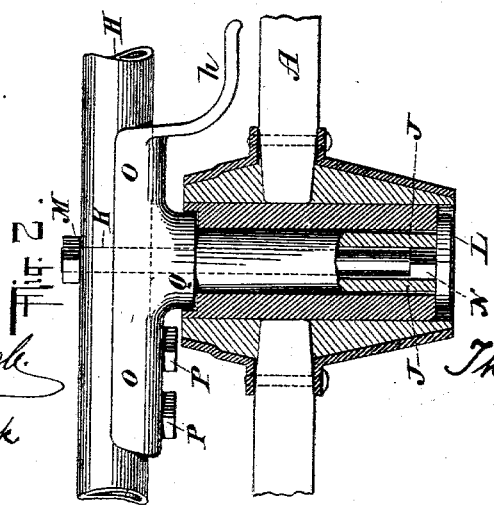
WITNESSES:
INVENTOR
Thomas Hill,
BY
Chas. C. Gill
ATTORNEY No. 633,998. Patented Oct. 3, 1899.
T. HILL.
PUSH WAGON.
(Application filed Mar. 10, 1899.)
(No Model.) 2 Sheets—Sheet 2.
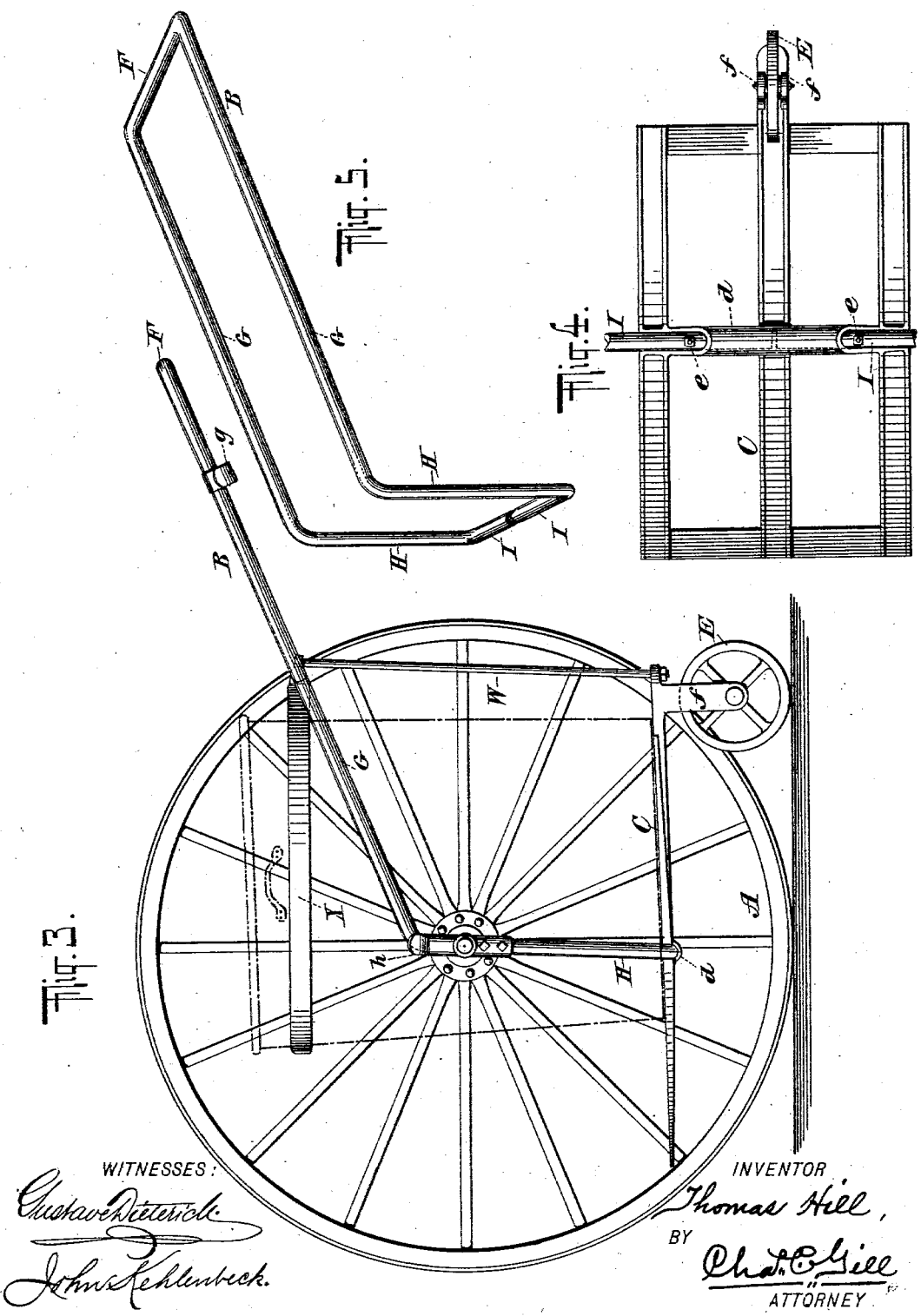
WITNESSES:
Gustave Dieterich
John Kehlenbeck
INVENTOR
Thomas Hill,
BY
Chas. C. Gill
ATTORNEY

UNITED STATES PATENT OFFICE.

THOMAS HILL, OF JERSEY CITY, NEW JERSEY.

PUSH-WAGON.

SPECIFICATION forming part of Letters Patent No. 633,998, dated October 3, 1899.

Application filed March 10, 1899. Serial No. 708,474. (No model.)

*To all whom it may concern:*

Be it known that I, THOMAS HILL, a citizen of the United States, and a resident of Jersey City, in the county of Hudson and State of New Jersey, have invented certain new and useful Improvements in Push-Wagons for Street-Cleaning Purposes, of which the following is a specification.

The invention relates to improvements in push-wagons for use in the cleaning of streets; and it consists in the novel features, arrangement, and combinations of parts hereinafter described, and more particularly pointed out in the claims.

The object of the invention is to produce a push-wagon which shall be light, durable, and inexpensive of construction and perfect in the details of its parts and which shall be adapted for removably supporting and transporting cans within which the collected dirt and refuse may be placed.

The invention will be fully understood from the detailed description hereinafter presented, reference being had to the accompanying drawings, in which—

Figure 1 is a top view of a wagon constructed in accordance with and embodying the invention. Fig. 2 is an enlarged sectional view through the hub of one of the side wheels and illustrating the manner of securing the axles for the wheels to the wagon-frame. Fig. 3 is a side elevation of the wagon with one wheel removed. Fig. 4 is a bottom view of the platform on which the can while being carried may rest, and this figure illustrates the manner of securing said platform to the supporting portions of the wagon-frame; and Fig. 5 is a perspective view of a metal pipe or tube bent to form the handle and side frames of the wagon and also the arms to which the aforesaid platform is secured.

In the drawings, A designates the side wheels of the wagon; B, the handle portion of said wagon; C, the platform upon which the can may rest, and X the spring, adapted for retaining the can in position upon said platform. The wheels A are of usual construction and therefore need not be specifically described. The wagon is supported upon the wheels A and a rear wheel E, the latter being a small wheel and located to the rear of the axles of the wheels A and about on a vertical plane with the rear edges of said wheels A, as illustrated in Figs. 1 and 3. The handle portion B comprises the transverse section or handle-bar F, the forwardly and downwardly inclined sections G G, the vertical sections H H, and the inwardly-extending sections I I, to the latter of which the platform C is secured, as hereinafter described, and to the sections H H of which the axles, hereinafter described, for the wheels A are secured. The portion B, comprising the sections F, G, H, and I, is clearly illustrated in Fig. 5 and is formed of one integral metal pipe or tube bent to create said sections, and, as illustrated, said portion B constitutes one of the main elements of the wagon-frame.

Upon the outer sides of the sections H of the portion B and adjacent to the juncture of said sections H with the inclined sections G are secured the tubular axles J, (see Fig. 2,) upon which the wheels A are mounted and through which passes the bolt K for retaining the wheels upon said axles, said bolt having the enlarged head L at its outer end to engage the hub of the wheel and being threaded at its inner end to receive at the inner side of the section H the securing-nut M. The bolt K at its outer portion is formed with the angular shoulder N to enter the correspondingly-formed outer end of the sleeve J, and at its inner end said bolt K passes entirely through the section H and is held by means of the nut M. The angular shoulder N at the outer end of the bolt K prevents said bolt from turning under the influence of the wheel A during the travel of the wagon. The tubular sleeve or axle J is cast or formed integrally with the bracket O, which fits upon the section H and is thereto secured by means of bolts P. The ease and facility with which the axles may be secured to the wagon-frame, the durability of their construction, and the convenience of securing the wheels A upon said axles will be apparent upon reference to Fig. 2. The sleeve J and bracket O are in one integral piece and secured to the section H by means of the bolts P, and at the point of the intersection between the sleeve or axle J and bracket O the latter is formed with the hub portion Q, which partly enters the hub of the wheel, and thus takes a part of the strain of said wheel, this strain being taken in line with the bolts P and close to the section H. After the wheel A has had its hub passed upon the tubular axle J the bolt K is applied and secured, and this completes the securing of the wheel upon the axle. The bolts K not only add to the strength of the axles J, but aid in securing said axles and the brackets O to the side sections H.

The downwardly and rearwardly inclined sections G G of the tubular portion B are connected at about their middle by means of the transverse rod or tube R, whose ends are formed with the ears S S, which engage the inner sides of said sections G and are thereto secured by means of the bolts T. The rod R strengthens the portion B of the wagon-frame, and in addition thereto the central portion of said rod R furnishes the ear V for taking the upper end of the rod W, whose lower end is connected with the platform C at the center of the rear edge of the latter. The rod W is a simple straight piece of metal and operates to strengthen the entire wagon-frame, and more especially to form a rigid connection between the rear edge of the platform C and the central portion of the transverse rod or tube R.

The central portion of the tube or rod R also affords means for securing the spring X in position at a proper elevation to constitute a clasp for the upper end of the can to be carried upon the platform C. The spring X is of durable character and in one piece of metal, bent to pass a little more than one-half way around the can and is secured at a central portion to the transverse rod R by means of the bolts $a$. The spring X describes a circular outline and is open at the front side of the wagon, and the ends of the spring X turn outwardly, as at $b\ b$, so as to enable the attendant to conveniently press the can between the arms of the spring and to remove the can from within said spring, it being the purpose to securely hold the can upon the platform C by means of the said spring X, but to permit of the removal of the can from said spring and platform when said can shall have become filled and it is desirable to substitute an empty can therefor. The bottom of the can will bear upon the platform C, so that the weight of the can can be sustained upon said platform. The upper end of the can will be clasped by the spring X, so as to be firmly retained in place and to admit of the convenient application of the can to the platform as well as its removal therefrom.

The platform C is simply a substantially horizontal frame of convenient size and length to receive the cans, and said platform is formed on the central transverse portion of its lower side with the tubular section $d$, within which the sections I I of the handle portion B are inserted, and said sections I I are secured within said tubular portion $d$ and to the platform C by means of bolts $e\ e$. The rear central portion of the platform C is formed with the downwardly-extending arms $f$, between which the small rear wheel E is mounted, as illustrated in Figs. 3 and 4. The platform C may be a light open frame, as illustrated in Figs. 1 and 4, and said platform is directly below the space outlined by the spring X and is centrally intermediate the wheels A A.

For convenience in carrying the broom the wagon-frame is provided with the clips or rests $g\ h$, the clip $g$ being secured to one of the side sections G adjacent to the handle-bar F and the clip or rest $h$ being formed integrally with the bracket Q, carrying the tubular axle J at one side of the wagon-frame.

The lightness, durability, simplicity, and inexpensive construction of the wagon-frame would seem to be apparent. The said frame is composed of the minimum number of parts, and these parts are so constructed and disposed that when put together by simple bolts they constitute a wagon-frame of extreme strength and one capable of withstanding the severe punishment to which push-wagons are subjected in the cleaning of streets.

Not only is the wagon constructed as above described both durable, simple, and inexpensive of construction, but it possesses great utility and convenience and imposes the minimum labor upon the person using the wagon. The construction of the frame of the wagon is such that the energy of the person pushing the same is directed on such lines that the wagon has an easy action no matter what load may be placed within the can carried by the wagon, and the construction and disposition of the parts thereof are such also that the wagon will have no tendency to tilt forward, but may be safely permitted to stand while the dirt and other refuse is being thrown into the can. The spring X affords a convenient means for sufficiently firmly holding the can upon the platform; but at the same time said spring without undue exertion on the part of the attendant may be caused to release the can, the attendant being simply required to pull the can from the wagon without other manipulation. It is also to be observed that the platform C is adjacent to the ground, and thus the attendant is not required to exert undue energy in removing the full can from the wagon. It is apparent also that with the construction above described the attendant may when removing the loaded can from the wagon tilt the front end of the wagon-frame downward, so that the can may practically slide down off of the platform C without requiring any exertion on the part of the attendant further than to guide and direct the can.

The wagon though simple in construction designedly possesses many features of advantage and is admirably adapted for the purposes for which it is intended.

What I claim as my invention, and desire to secure by Letters Patent, is—

1. The wagon having the wheels and handle portion, combined with the platform suspended below the axles to receive the can, and the spring to detachably retain the can upon said platform; substantially as set forth.

2. The wagon having the frame and side wheels, combined with the rearwardly-extending handle, the platform suspended below the axles of said wheels to receive the can, the wheel at the rear end of said platform, the vertical rod intermediate the said platform and main frame, and the spring for clasping the upper portion of the can; substantially as set forth.

3. The wagon comprising the portion B having the sections F, G, H, I, and the side wheels mounted upon axles secured to said sections H, combined with the platform secured upon said sections I, the transverse rod R connecting said sections G, and the spring X secured to said rod R and opening frontward to clasp the can to be placed upon said platform; substantially as set forth.

4. The wagon comprising the handle, the vertical sections H carrying the axles for the side wheels, and the sections I extending inward toward one another from the lower ends of the sections H, combined with the platform C having the tubular portion $d$ to receive the inner ends of said sections I, and the wheel E at the rear end of said platform; substantially as set forth.

5. The wagon having the handle F, the downwardly-inclined sections G, and the vertical sections H, combined with the axles for the side wheels secured upon said sections H, the platform suspended from the lower ends of said sections H, the wheel at the rear end of said platform, and means for detachably retaining the can to be carried on said platform; substantially as set forth.

6. The wheels, the side sections H carrying the axles for said wheels, the platform secured to the lower ends of said side sections H, and a handle, combined with means for engaging the upper portion of the can to be carried on said platform; substantially as set forth.

7. The wheels, the side sections H carrying the axles for said wheels, the platform secured to the lower ends of said side sections H, and a handle, combined with the spring X opening frontward and to clasp the upper portion of the can carried upon said platform; substantially as set forth.

8. In a wagon, the side wheels and frame, combined with the platform suspended below the axles of said wheels, and the open spring above said axles and over said platform to detachably retain the can to be carried upon said platform; substantially as set forth.

9. The wagon-frame comprising the handle portion B, the sections G, the transverse rod R connecting said sections G, and the vertical sections H to which the axles of the side wheels are secured, combined with the platform secured to the lower ends of said sections H, the wheel at the rear end of said platform, the vertical rod W extending intermediate said platform and said transverse rod R, and the open spring X secured to said rod R; substantially as set forth.

10. In a wagon, the handle, the side sections H, the brackets secured to said sections and having the tubular axles, the side wheels mounted on said axles, and the bolts which enter said tubular axles and secure the said wheels thereon, combined with the platform secured to said sections H below said axles, and the spring X over said platform; substantially as set forth.

Signed at New York, in the county of New York and State of New York, this 20th day of February, A. D. 1899.

THOMAS HILL.

Witnesses:
CHAS. C. GILL,
E. JOS. BELKNAP.